Nov. 4, 1958  C. VAN DER LELY ET AL  2,858,661
TRACTOR MOUNTED STABLE SIDE DELIVERY RAKE
Filed June 4, 1953
FIG: 1
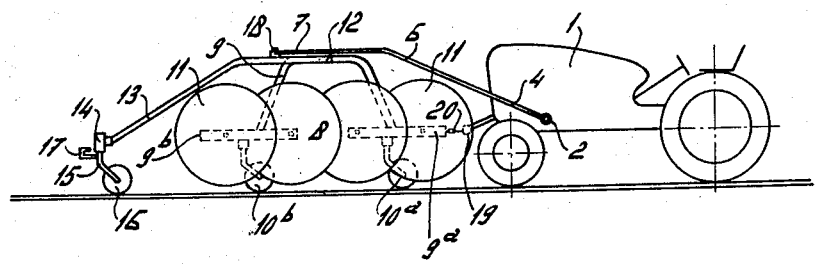
FIG: 2
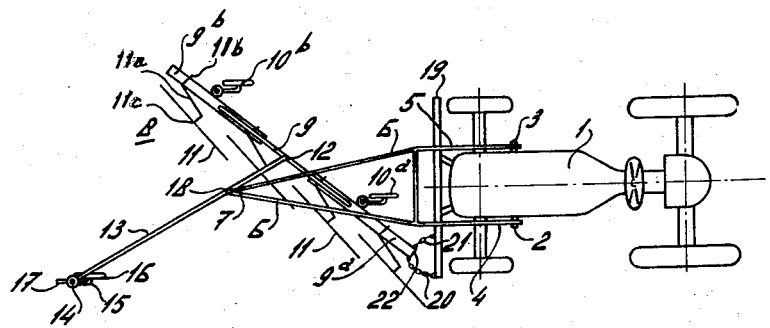
FIG: 3
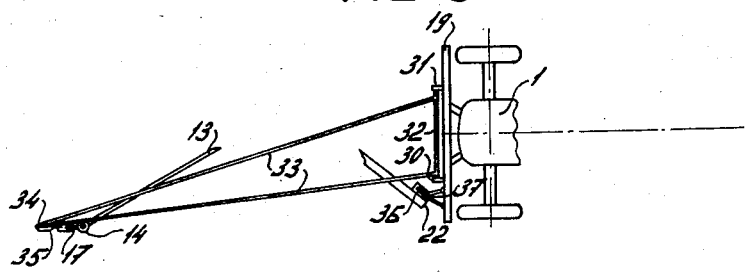
INVENTOR
BY
ATTORNEY

United States Patent Office 2,858,661
Patented Nov. 4, 1958

2,858,661

TRACTOR MOUNTED STABLE SIDE DELIVERY RAKE

Cornelis van der Lely and Ary van der Lely, Maasland, Netherlands, assignors to C. van der Lely N. V. Maasland, Netherlands, a limited company of the Netherlands Application June 4, 1953, Serial No. 359,462

Claims priority, application Netherlands June 11, 1952

6 Claims. (Cl. 56—377)

This invention relates to agricultural implements, and more specifically to raking devices of the type comprising a frame, rotatory raking means fixed to said frame, supporting members for movably supporting said frame upon the ground and drawing means connected to said mobile frame for applying a tractive force thereto.

In raking devices of this kind, it has already been proposed to draw the device forward by means of a tractor placed in front of the device and coupled to a drawing means associated with said device. This presents the drawback that the tractor will move along that part of the terrain upon which the mown crop, such as grass or hay, is deposited. To eliminate this drawback, it has also been proposed to push raking devices forward by tractors arranged therebehind. This arrangement has, however, the disadvantage that the raking devices cannot be used so as to be moved forward by tractive power.

An object of the present invention is to improve the possibilities for using raking devices and to permit said devices either to be pushed forward by a tractor or to be moved forward by tractive power.

Another object of the invention is to combine a raking device with a tractor placed behind said device and carrying an arm to be hingedly connected to said raking device.

A further object of the invention is to provide a raking device with a drawing arm hingedly connected to the mobile frame of said device and to connect the arm of the tractor with said drawing arm.

A still further object is to connect the arm of the tractor so as to be substantially immovable in lateral direction.

With these and other objects, features and details in view, the invention will be hereinafter more fully described with reference to the accompanying drawing in which some preferred embodiments of the invention are shown by way of example and in which:

Fig. 1 is a side elevation of a side delivery rake combined with a tractor arranged therebehind, Fig. 2 is a plan view of the combination shown in Fig. 1 and Fig. 3 a partial plan view of a modified combination.

Referring to Figs. 1 and 2 of the drawing, a tractor 1 is provided with lateral shafts or bolts 2 and 3 defining a transverse axis and to which rods or bars 4 and 5 are hingedly connected. Said rods 4 and 5 each form part of a forwardly extending arm 6, the foremost part 7 of which carries a coupling member.

In front of the tractor 1, a side delivery rake 8 is arranged, the frame of which comprises a bow or yoke 9 carrying a beam structure including two beams 9a and 9b in alignment with each other and supported by running wheels 10a and 10b, respectively. To the beams 9a and 9b, rotatable rake wheels 11 are connected, by means of cranks 11a which are journaled in bearings 11b on the beams 9a and 9b, the rake wheels 11 being freely rotatable about the crank pins 11c of the cranks 11a. The rake wheels 11 are free wheeling and are arranged in echelon and have their wheel planes at an angle to the direction of travel of the mobile frame.

A drawing arm 13 is hingedly connected at 12 to the bow 9, so as to be movable substantially in a horizontal direction. The free end of the drawing arm 13 which is also included in the beam structure carries a bearing 14 for the support 15 of a self adjusting or swivel wheel 16, said support 15 being rotatable about a vertical axis.

Rigidly secured to the support 15 is a hook or similar coupling member 17 upon which any tractive force may be applied, so that the side delivery rake 8 is adapted for being drawn forward by a tractor or by an animal. On the drawing arm 13, a pin or other fastening member 18 is provided which is adapted to form a hinged connection with the coupling member 7 in front of the forwardly extending arm 6 of the tractor 1.

In front of the tractor 1, a bar or tube 19 is rigidly secured, said bar carrying short chains 20 and 21 connected to the rear part 22 of the beam 9a. By this connection any excessive lateral displacement of the side delivery rake 8 with regard to the tractor 1 is prevented when turns are made, whereas the frame is free to adjust itself in height independently of the tractor.

In the illustrated arrangement, the end 22 of the beam 9a generally stretches the chain 20. By displacing the hinged connection 7—18 to the left of the rake, it will result in that the chains 20 and 21 transmit practically no forces to the rake, especially when one of the other running wheels 10a and 10b are also made self adjusting.

In the embodiment shown in Fig. 3, the bar 19 in front of the tractor carries bearings 30 and 31 for a bar or tube 32 forming part of a rigid forwardly extending arm 33 which has its foremost extremity 34 connected to the hook 17 by means of a hinged connection 35. When being driven straight on, the side delivery rake will automatically remain in the exact position. In this construction it is not necessary to provide a running wheel 16 in the form of a self adjusting or swivel wheel.

In order to prevent lateral deviation of the machine when turns are made, the rear extremity 22 of the beam 9a is provided with a guiding slot 36 through which extends a vertical pin 37 secured to the bar 19. As in the construction with chains 20 and 21 shown in Figs. 1 and 2, this construction permits free relative movement, in vertical direction, of the raking device and the tractor.

In both embodiments, the coupling of the forwardly extending arm of the tractor to the side delivery rake is such that at the point of connection substantially no moments of forces are transmitted. Consequently said arm may be much lighter than with an arm which would be subjected to bending or torsional moments. In the illustrated examples the coupling of the forwardly extending arm to the tractor has also been effected in such a manner that no harmful moments can be transmitted.

It is to be noted that the invention contemplates the use of a stable raking device which is ground-supported at three points in the form of a tri-pod. For example, in Fig. 2, a raking device comprising arm 13, yoke 9, beams 9a and 9b, and rake wheels 11 is supported by running wheels 10a and 10b as well as by wheel 16.

It will be understood that the side delivery rake may alternately be a swath turner or other raking device, or that said side delivery rake may be transformable into a swath turner or the like.

What is claimed is:

1. A raking implement comprising a tractor, a stable ground supported raking device in front of the tractor, a first means on and extending forwardly of the tractor and pivotally connected to said stable raking device, and second means on the tractor and connected with the raking device to limit pivotal movement thereof.

2. A raking implement as claimed in claim 1 wherein said first means comprises an arm hingedly connected to the tractor and including a foremost part, said stable raking device comprising a frame, an arm hingedly connected to said frame, a fastening member pivotally connecting the latter said arm to said foremost part with the frame in trailing relationship, and wheels on and supporting the latter said arm and frame.

3. A raking implement as claimed in claim 1 wherein said stable raking device is pivotable relative to said first means, said second means comprising chains connected between the tractor and stable raking device to limit pivotal movement of the latter.

4. A raking implement as claimed in claim 1 comprising shafts on said tractor and defining an axis transverse to the latter, said first means being coupled to the shafts for hinged movement relative to said axis.

5. A raking implement as claimed in claim 1 wherein the stable raking device comprises freely rotatable rake wheels operatively associated in echelon, and a frame supporting the rake wheels and coupled to said first means.

6. A raking implement as claimed in claim 1 comprising three running wheels on and supporting the stable raking device at three spaced positions.

References Cited in the file of this patent

UNITED STATES PATENTS

| | | |
|---|---|---|
| 2,296,065 | Slamp | Sept. 15, 1942 |
| 2,436,475 | Jones et al. | Feb. 24, 1948 |
| 2,447,354 | Morrill | Aug. 17, 1948 |
| 2,481,995 | Godley | Sept. 13, 1949 |
| 2,597,828 | Spurlin | May 20, 1952 |
| 2,712,723 | Ryan | July 12, 1955 |

FOREIGN PATENTS

| | | |
|---|---|---|
| 649,431 | Great Britain | Jan. 24, 1951 |